United States Patent [19]

Siemers et al.

[11] Patent Number: 5,070,228

[45] Date of Patent: Dec. 3, 1991

[54] METHOD FOR PLASMA SPRAY JOINING ACTIVE METAL SUBSTRATES

[75] Inventors: Paul A. Siemers, Clifton Park; Stephen F. Rutkowski, Duanesburg, both of N.Y.

[73] Assignee: General Electric Company, Schenectady, N.Y.

[21] Appl. No.: 539,248

[22] Filed: Jun. 18, 1990

[51] Int. Cl.⁵ .............................................. B23K 9/00
[52] U.S. Cl. ........................... 219/121.46; 219/76.16; 219/121.59; 219/121.47; 427/34
[58] Field of Search ............... 219/121.45, 121.46, 219/121.47, 76.15, 76.16, 121.48, 121.59; 427/34

[56] References Cited

U.S. PATENT DOCUMENTS

| | | | |
|---|---|---|---|
| 3,278,720 | 2/1964 | Dixon | 219/121.45 |
| 3,839,618 | 10/1974 | Muehlberger | 219/121.47 |
| 3,928,745 | 6/1973 | Demars et al. | 219/121 P |
| 4,159,410 | 6/1979 | Cooper | 219/121.45 |
| 4,162,389 | 7/1979 | Shimdada et al. | 219/121.45 |
| 4,788,409 | 8/1987 | Yamade et al. | 219/121.46 |
| 4,805,294 | 2/1989 | Siemers | 427/34 |
| 4,902,870 | 2/1990 | Frind et al. | 427/34 |

Primary Examiner—Mark H. Paschall
Attorney, Agent, or Firm—James E. McGinness; James C. Davis, Jr.; James Magee, Jr.

[57] ABSTRACT

A method for joining substrates of the active metals, such as niobium, tantalum, and titanium, and alloys of the active metals is disclosed. The substrates are joined in a deposit zone traversing areas to be joined on the substrates. The areas to be joined are formed to have deposit receiving surfaces that will form a diffusion bond with a spray deposit. An active metal or an alloy of an active metal compatible with the substrates to be joined is provided as a powder for plasma spraying. The substrates are disposed in a radio frequency low-pressure plasma-spray apparatus to receive a spray deposit on the deposit receiving surfaces in the zone. The deposit receiving surfaces are preheated and cleaned by passing the surfaces in heat coupling relation by the plasma, and placing the substrates at a negative DC potential relative to the plasma. A transferred arc from the radio frequency plasma-spray apparatus to the surfaces is generated that cleans the surfaces. The compatible powder is low-pressure plasma-sprayed deposited onto the preheated and cleaned deposit receiving surfaces to at least form a deposit in the zone that is diffusion bonded to the deposit receiving surfaces.

7 Claims, 6 Drawing Sheets

METHOD FOR PLASMA SPRAY JOINING ACTIVE METAL SUBSTRATES

BACKGROUND OF THE INVENTION

This invention relates to a method for joining active metals, alloys of active metals, composites formed from active metals or alloys of active metals, or combinations thereof.

As used herein the term "active metals" means the metals niobium, tantalum, zirconium, vanadium, titanium, molybdenum, tungsten, and hafnium. The active metals possess a number of common physical, chemical, and engineering properties; the principal ones being high melting point, chemical activity in the liquid and solid states at elevated temperatures with atmospheric gases, susceptibility to embrittlement, and a high-rate of grain growth when heated above the recrystalization temperature.

As used herein, the term "active metal substrates" means the articles and members formed from the active metals, alloys of the active metals, or composites formed from the active metals or alloys of active metals. For example, active metal substrates are shown in U.S. Pat. No. 4,775,547 where titanium alloy composites are reinforced with silicon carbide filaments. It is disclosed in the U.S. Pat. No. 4,775,547 that the silicon carbide reinforced titanium alloy composites have a high strength-to-weight ratio, making them attractive for use in aircraft engines having high thrust-to-weight ratios, aircraft structures, as well as in wound rotors, casings, and other intermediate temperature high stress applications.

Many applications for the use of such active metal substrates will require joining of the active metal substrates. For instance, titanium alloys will be joined to other titanium alloys, or titanium alloys will be joined to silicon carbide reinforced titanium alloy composites. The ductility and toughness of the joints and the joined active metal substrates depends to a marked extent on the content of interstitial impurity elements introduced into the substrates during the joining process. At elevated temperatures the active metals readily form oxides, hydrides, and nitrides which embrittle the metal. Therefore, in joining active metal substrates it is important to protect the substrates from exposure to interstitial elements such as oxygen, nitrogen, and hydrogen, and to keep the content of interstitial impurity elements in the joint and substrates to a minimum.

One successful method known for joining active metal substrates is vacuum diffusion bonding. Vacuum diffusion bonding is a pressure welding process where pieces to be joined are placed in a vacuum, heated, and pressed to cause the edges of the pieces to move within the range of atomic forces. The interdiffusion of atoms across the interface between the two substrates causes the bonding. Strong and ductile joints can be formed because the metals are protected from exposure to interstitial elements, and the temperature and degree of substrate deformation during the bonding cycle can be controlled to provide desired microstructures in the substrates and joints. However, the surfaces of the substrates, and the roughness of the surfaces must be carefully prepared to provide intimate contact and mating of the surfaces to be joined during the bonding.

It is an object of this invention to provide a method for joining active metal substrates by radio frequency low-pressure plasma-spraying.

Another object of this invention is to provide a method for joining active metal substrates while minimizing the introduction of interstitial impurity elements in the joint.

Another object of this invention is to provide a method for joining active metal substrates without degrading the strength and toughness properties of the substrate.

Another object of this invention is to provide a method for joining active metal substrates by a strong diffusion bond, without intimate contact and mating of the substrate surfaces to be joined.

BRIEF DESCRIPTION OF THE INVENTION

We have discovered a method for joining active metal substrates that maintains the integrity, strength, and toughness of the substrates while providing a strong joint. The joint is comprised of a spray deposit, and the active metal substrates are joined in a deposit zone traversing the areas to be joined on the substrates. The substrates are formed to have deposit receiving surfaces that will form a diffusion bond with the spray deposit. The spray deposit is formed by a radio frequency low-pressure plasma-spray apparatus, sometimes herein referred to as a radio frequency plasma-spray apparatus.

An active metal or an alloy of an active metal compatible to the substrates to be joined is provided as a powder for plasma spraying, and are herein referred to as compatible powders. Compatible powders form spray deposits that provide sufficient strength for the joint without embrittling the substrates, for example, by forming brittle intermetallic phases. Preferably, the powder has a minimum particle size of about 100 microns to minimize the introduction of embrittling interstitial elements such as carbon, hydrogen, oxygen, and nitrogen into the joint.

The active metal substrates are disposed in a radio frequency low-pressure plasma-spray apparatus to receive a spray deposit on the deposit receiving surfaces in the zone. The substrates are placed at a negative DC potential relative to the plasma, and the deposit receiving surfaces are passed in heat coupling relation by the plasma produced by the radio frequency plasma-spray apparatus, thereby generating a transferred arc from the radio frequency plasma-spray apparatus to the surfaces.

The transferred arc cleans the surfaces, and the plasma and transferred arc also act to preheat the surfaces. Preferably the plasma and transferred arc are controlled to remove substantially all oxide from the surfaces while preheating the surfaces to a red hot condition without causing melting. The red heat condition is characterized by diffusion of atoms in the metal, and is generally found at temperatures above about 1200° F. for most metals. The compatible powder is low-pressure plasma-spray deposited onto the preheated and cleaned deposit receiving surfaces to at least form a deposit in the zone that is diffusion bonded to the deposit receiving surfaces.

In a preferred method, the spray deposit is heat treated in an inert atmosphere or vacuum to cause further diffusion bonding and improve the strength and ductility of the joint. In another preferred embodiment, the deposit is hot isostatically pressed to essentially fully densify the deposit and cause further diffusion bonding.

BRIEF DESCRIPTION OF THE DRAWINGS

The detailed, description of the invention makes reference to the following drawings.

DETAILED DESCRIPTION OF THE INVENTION

In the method of this invention active metal substrates are joined while minimizing embrittlement of the substrates and the joint. The surfaces to be joined on the substrates do not require careful preparation, or control of the surface roughness so that there is intimate contact and mating between the surfaces. As a result, a wide variety of joint configurations such as lap joints, butt joints or tee joints can be made.

The active metal substrates are joined in a deposit zone that traverses the areas to be joined on the substrates. The deposit zone is at least the area between the surfaces to be joined on two adjacent substrates. The surfaces to be joined are deposit receiving surfaces formed to accept a plasma-spray deposit and form a diffusion bond with the deposits. For example, it is known that a surface at an angle of 90 degrees to a plasma spray will form a strong diffusion bond with the spray deposit, however, a surface that is at an angle of 1 degree to a plasma spray will not form a strong diffusion bond with the spray deposit. Preferably, the angle between the plasma spray and the deposit receiving surface is between about 30 to 80 degrees.

The deposit receiving surfaces have an end portion extending furthest into the deposit zone. Preferably, the deposit receiving surfaces are in adjoining relationship so that the end portions are in contact along a line traversing the deposit zone.

Figure 1:
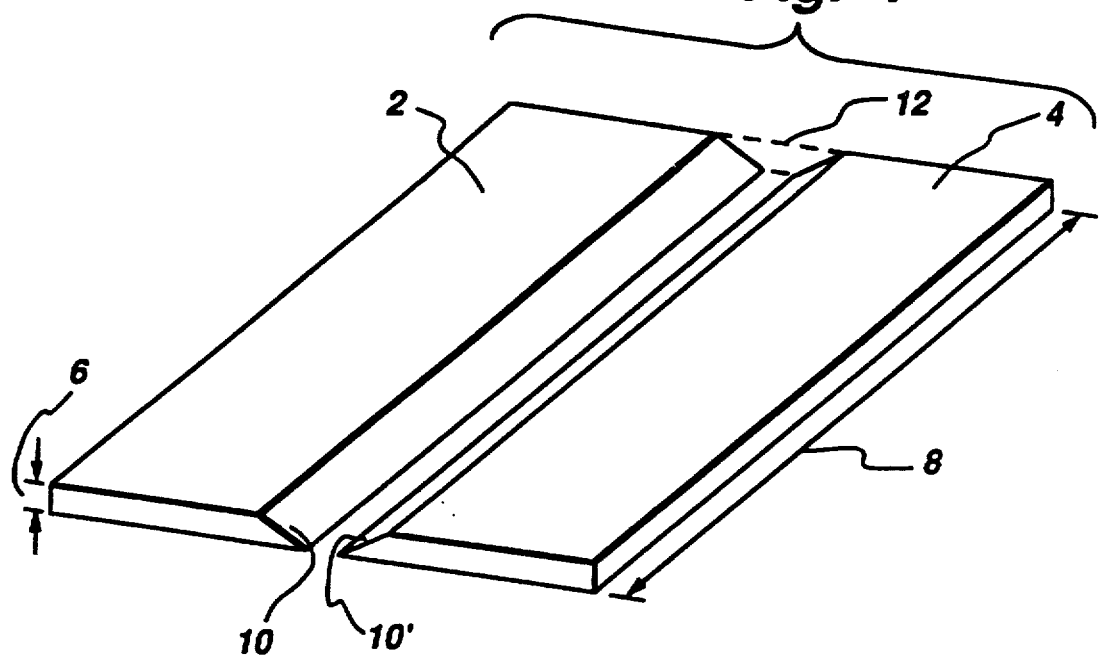
FIG. 1 is a diametric view of two substrates that are to be joined.

One embodiment for the method of joining active metal substrates can be shown by first referring to FIG. 1. Active metal plate 2, and active metal plate 4, are joined along surfaces traversing the thickness 6 and width 8 dimensions of the plates. Deposit receiving surfaces 10 and 10' traverse the thickness dimension 6 and width dimension 8, and are formed to receive a spray deposit that will form a diffusion bond with the surfaces 10 and 10'. Deposit receiving surfaces 10 and 10, are at an angle of about 45 degrees from vertical direction 13, vertical direction 13 being the direction of the plasma spray. Deposit zone 12 is at least the area between deposit receiving surfaces 10 and 10'. A radio frequency low-pressure plasma-spray is directed at the deposit zone 12 to form a deposit that at least fills the deposit zone 12.

Figure 2:
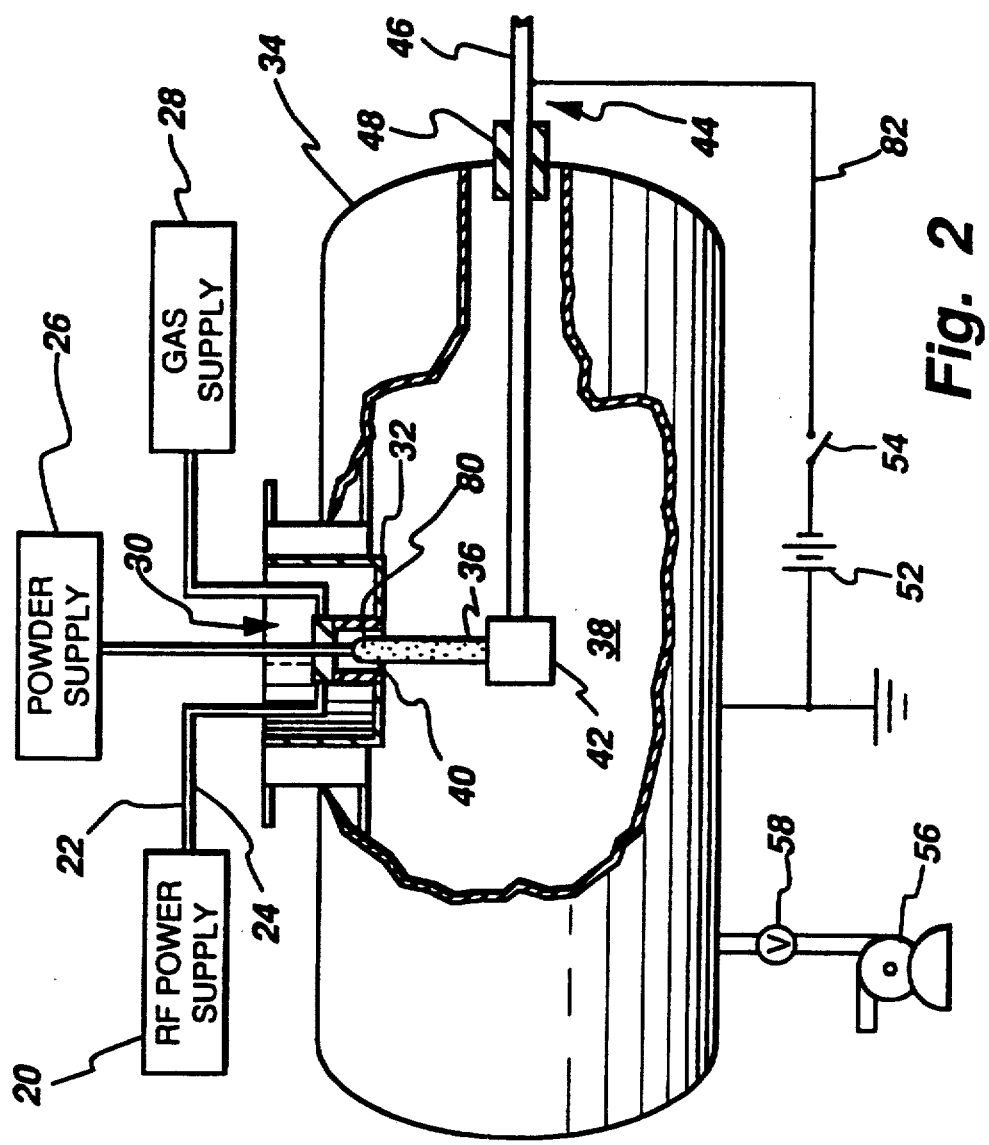
FIG. 2 is a partial sectional view of a side elevation of an apparatus employing a radio frequency plasma-spray apparatus in accordance with the method of this invention.

FIG. 2 shows diagrammatically a typical arrangement of a radio frequency plasma heating apparatus, such as a radio frequency low-pressure plasma-spray apparatus for providing a spray deposit on a target. The apparatus comprises a radio frequency generating device 30 secured to a plasma device support 32 which comprises, for example, a cylindrical metal well. Device 30 is connected to a radio frequency power supply 20 by leads 22 and 24. The device 30 is usually provided with a coolant, usually water, supplied by a coolant circuit, not shown.

The device 30 is conventionally provided with a plasma or torch gas supply system 28, which includes gas storage tanks for one or more gases, and valves for adjusting both the choice of gas and the flow rates for the individual gases to be used in forming the plasma. A powder supply means 26 supplies powder entrained in a carrier gas to the device 30 through a connecting hose. A commercially available powder supply mechanism can be used to deliver the powder to the spray gun. One particular model used in the practice of this invention was a powder feeder manufactured by Plasmadyne, Inc. of California. It is equipped with a cannister on top that holds the powder. A wheel at the bottom of the cannister rotates to feed powder into a powder feed hose. The powder is then carried by a carrier gas from the powder feeder along the hose to the spray device 30.

The device 30 is secured to the support 32 centrally within the well. Support 32 is secured to a cylindrical metal tank 34 and projects somewhat into the interior of tank 34. The support 32 and the tank 34 are electrically conductively connected. The support 32 is an annular structure and is electrically conductively connected to the tank 34 throughout its annular region. The radio frequency plasma device 30 is positioned at the bottom of the well of support 32 to inject a plasma 36 into the interior 38 of the tank 34. The plasma 36 passes into the tank through an opening 40 in the support 32. Vacuum pump 56 and vacuum valve 58 are in communication with tank 34 to provide a vacuum in tank interior 38. The tank is evacuated as is done in a conventional radio frequency plasma system, e.g., to about 250 torr.

The substrates are mounted on a target 42 within the tank interior 38. The target 42 is carried by a mechanical actuator sometimes referred to as a sting 44. The sting 44 can be moved inward and outward enabling the target 42, and the substrates mounted thereon, to be positioned and moved relative to the plasma 36. The substrates are mounted on the target 42, so that the deposit zone 12, in FIG. 1, can be passed in heat coupling relation by the plasma 36 through the movement of sting 44. The deposit receiving surfaces 10 and 10', in FIG. 1, are preheated by the plasma 36 by such movement of sting 44. While preheating, the deposit receiving surfaces are also transferred arc cleaned by the method and apparatus shown in U.S. Pat. No. 4,902,870 incorporated by reference herein.

Briefly stated, preheating and transferred arc cleaning are performed as follows. The sting 44 comprises a metal manipulator mechanism 46, only a portion of which is shown, for manipulating the target 42. An insulated bearing support 48 electrically isolates the mechanism 46 from the tank 34. A DC voltage source, for example, a battery 52 has its positive terminal connected to the tank 34 and its negative terminal connected to the sting 44 via a circuit breaker switch 54. The positive terminal of battery 52 is also connected to system ground.

Figure 3:
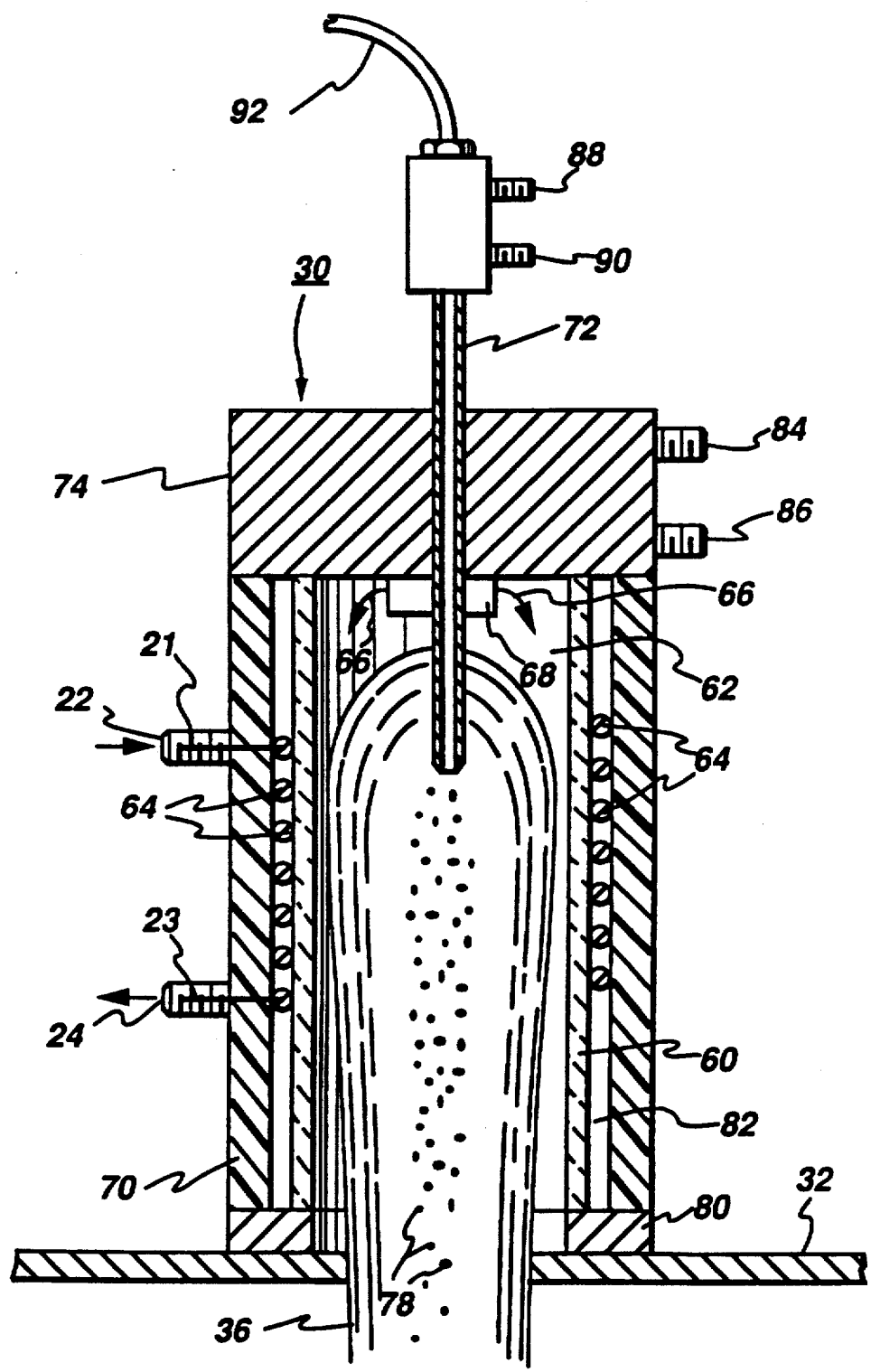
FIG. 3 is a more detailed sectional elevation view of the plasma device shown in FIG. 1.

In FIG. 3, radio frequency plasma device 30 comprises a top metallic member 74 connected to an electrically insulative dielectric enclosure 60, which typically may be made of quartz forming a cylindrical chamber 62 for the plasma. A second tubular insulating member 70, which may be made of polytetrafluoroethylene or the like, is connected to top member 74 and enclosure 60 defining chamber 82 therebetween. An electrical induction coil 64 located in chamber 82 is connected to the power leads 22 and 24 from the source of radio frequency energy 20, in FIG. 2, via leads 21 and 23. Conduits 22 and 24 are adapted to carry both current and coolant by means that can be recognized in the art. Chamber 82 is also in communication with a coolant supply, not shown, via conduits 22 and 24 so that it is filled with flowing coolant in direct contact with the inner surface of enclosure 60 and with coil 64. Arrows indicate the preferred direction of water flow.

Coil 64 surrounds the enclosure 60 for coupling radio frequency energy to an ionizable gas, such as argon, which is injected into the chamber to produce the plasma. The coil 64, enclosure 60 and the second tubular insulating member 70 are concentric. An annular section 80, is an electrically conductive metal, and is at the exit port of the plasma spray device 30. The section 80 structurally holds the various elements together including the enclosures 60 and 70 and the coil 64 and provides a mounting structure for the device 30.

The gas supply system 28, in FIG. 2, is connected to device 30 at gas inlets 84 and 86. Gas inlets 84 and 86 are connected by passageways, not shown, to annular ring 68. The ionizable gas enters the plasma chamber 62 from outlets in annular ring 68, some of the outlets passing radially and some passing tangentially from ring 68. Gases passing radially from ring 68 are herein referred to as radial gas, and are supplied from inlet 86. Gases passing tangentially from ring 68 are herein referred to as swirl gas and are supplied from inlet 84. The swirl gas is argon, and the radial gas can be at least one of the group argon, helium, and hydrogen.

Preferably the radial gas is an argon helium mixture. More preferably, the radial gas is 20 to 90 volume percent helium and the balance argon. Still more preferably for powder particles of 105-250 microns the radial gas is about 40 to 60 volume percent helium, up to about 6 volume percent hydrogen and the balance argon. Most preferably for powder particles of 177-250 microns, the radial gas is about 57 volume percent helium, about 6 volume percent hydrogen and the balance argon. The gases flow in the direction of arrows 66 into chamber 62. A water cooled particle injection tube 72 extends axially into the plasma chamber 62 through the end member 74 and the gas injection ring 68. Tube 72 comprises a central conduit for in-flow and out-flow of coolant, e.g., water supplied through inlets 88 and 90. Hose 92 delivers powder entrained in a carrier gas from the powder supply means 26, in FIG. 2, to the tube 72. The particle injection tube 72 injects particles 78, for example an active metal, into the plasma 36 so that the particles are melted and sprayed upon the target by the plasma.

Referring to FIG. 2, the plasma device 30 as described is similar to a commercially available plasma gun manufactured by the TAFA Company. The annular section 80 is used as a DC electrode for transferred arc cleaning a substrate mounted on the target 42. The section 80 is electrically conductively coupled to the support 32 which in turn is electrically conductively coupled to the tank 34. The tank 34 is at ground potential, so that the section 80 is also at ground potential. The substrates mounted on target 42 being coupled to the sting 44 mechanism 46 is at a negative DC potential relative to the section 80.

In operation, the device 30 is preferably operated at a frequency of 250-450 kilohertz. Switch 54, which may be a conventional circuit breaker couples the DC voltage from battery 52 to the sting 44 and tank 34 producing a negative potential at the sting.

Referring to FIGS. 2 and 3, closing the switch 54 provides a DC voltage between the section 80 and the substrates mounted on the target 42. The section 80 is sufficiently close to the plasma 36 plume in the nozzle exit port opening 40 to provide a DC arc from the section 80 via the plume 36 to the substrates on target 42. It is believed that the DC arc transfers from the section 80 to the next adjacent plume 36 and thus to the substrates mounted on the target 42, performing the desired cleaning action on the deposit receiving surfaces on the substrates. It has been observed that good cleaning is obtained with currents as low as 50 amperes. As discussed above, molecular gases can be added to the plasma but molecular gases have higher thermal conductivities than argon, and the transferred arc cleaning current drops significantly as compared with argon alone. Therefore, when a molecular gas such as hydrogen is employed in combination with argon, the higher thermal conductivity of the plasma gases normally requires increased voltage to initiate and sustain a transferred arc for cleaning the substrates.

While a 72 volt battery 52 provides arc cleaning for a substrate when using argon and hydrogen in the plasma, voltages higher than 72 volts can be used to create greater arc cleaning power. For example, voltages in the range of 150 to 300 volts are preferable. The power supplies that are presently available for use with DC transferred arc cleaning systems may be used with radio frequency guns. Therefore, currently available DC power supplies are useful for providing transferred arc cleaning of substrates by radio frequency plasma guns regardless of the power level of the radio frequency guns.

Preferably the deposit receiving surfaces are preheated to the red heat condition, and transferred arc cleaned to remove essentially all oxide. Powdered particles, entrained in a carrier gas such as helium, are introduced into the plasma 36 through tube 72. The powdered particles are an active metal, or alloy of an active metal compatible with the substrates. The heat of the plasma 36 is controlled to cause melting of the particles as they move through the plasma so that the particles are deposited as liquid droplets that rapidly solidify on the deposit receiving surfaces of the substrates mounted on target 42, without melting the deposit receiving surfaces. Preferably, the particle size is about 105 to 177 microns, however, powders as small as 75 microns or as large as 250 microns can be used.

A compatible active metal, or active metal alloy is plasma sprayed onto the deposit receiving surfaces of the substrates. Preferably, when the same active metal substrates are being joined, the compatible powder has the same composition as the substrates. However, when different active metal substrates are joined, a compatible powder is a powder that forms a deposit providing sufficient strength and toughness for the joint without embrittling the substrates.

Figure 4:
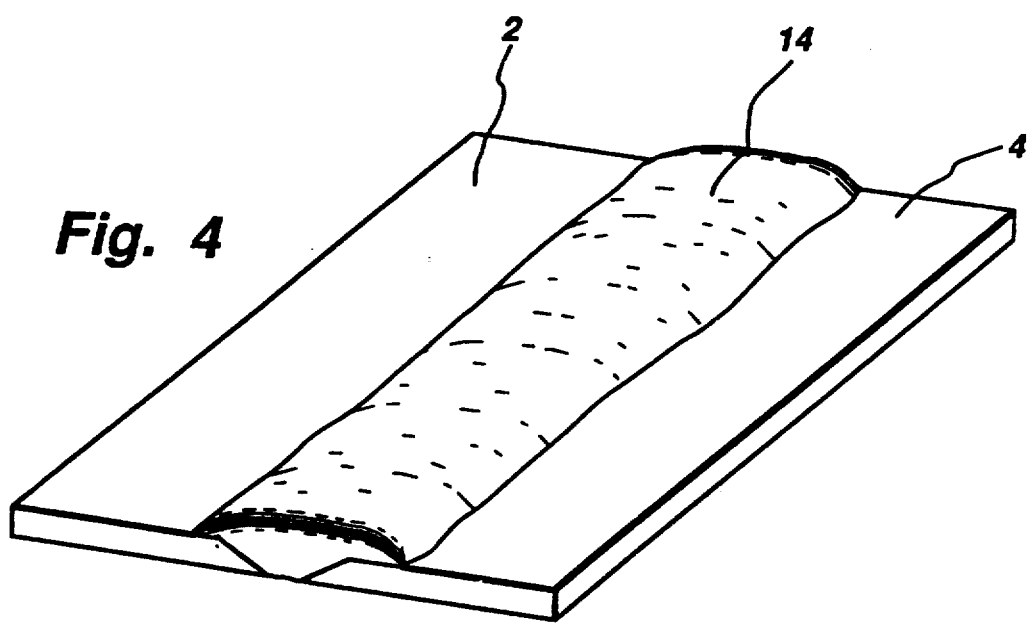
FIG. 4 is a diametric view of two joined substrates.

Referring to FIG. 2, the vacuum system is operated to maintain a pressure of approximately 250 torr in the low pressure plasma deposition chamber within the tank 34. The sting 44 is moved inward and outward within the evacuated chamber as the plasma 36 is used to melt particles into molten droplets to be deposited on the deposit receiving surfaces of the substrates mounted on the target. Referring to FIG. 4, the substrates are passed by the plasma in a series of passes, to form a deposit 14 that at least fills the deposit zone. The deposit 14 forms the joint between substrates 2 and 4.

The joint can be further improved by post-treatments to the plasma spray deposit. One post-treatment is vacuum heat treating to cause diffusion between the deposit and the substrate to improve the strength and ductility of the joint. Another post-treatment is hot isostatic pressing to essentially fully densify the deposit. For example, a plasma spray deposit of a titanium alloy comprised of 6 weight percent aluminum, 4 weight percent vanadium, and the balance titanium, and herein referred to as Ti-6Al-4V, can be vacuum heat treated at 900° C. for 3 hours, or hot isostatically pressed for 3 hours at 900° C. and 15 ksi of argon gas pressure. Low-pressure plasma-spray deposits have been found to be sufficiently dense with little surface connected porosity, allowing densification during hot isostatic pressing without a protective envelope for the deposit.

The following example further discloses the method of joining active metal substrates.

EXAMPLE 1

Three Ti-6Al-4V plates, 0.25 inch thick, 1.5 inches wide, and 6 inches long had a trough machined along the length of the plate at mid-width. The trough was 0.08 inch deep, 0.10 inch wide at the base, and the sides of the trough were at a 45 degree angle from the vertical or thickness direction. Powder of the Ti-6Al-4V alloy, fabricated by the plasma rotating electrode process was obtained. Powder of a titanium aluminide alloy comprising 14 weight percent aluminum, 21 weight percent niobium, and the balance titanium, herein referred to as Ti-14Al-21Nb, was fabricated by the hydride-dehydride process. Titanium alloy powders formed by the hydride-dehydride process have a high level of interstitial impurity elements carbon, nitrogen, and oxygen. Therefore deposits sprayed from powders formed by the hydride-dehydride process are expected to have reduced ductility and toughness.

The powders were sieved into a size range of minus 80 to plus 140 mesh size, a nominal particle size of about 105 to 177 microns. The trough in the center of each plate was filled by plasma spraying in four passes with the Ti-6Al-4V or Ti-14Al-21Nb alloy. On the first plate the trough was filled with the Ti-6Al-4V alloy. On the second and third plates the trough was preheated and transferred arc cleaned, and filled with the Ti-6Al-4V alloy on the second plate and the Ti-14Al-21Nb alloy on the third plate. The plasma spray parameters are given below in Table 1.

TABLE 1

| Plasma Spray Parameters | |
|---|---|
| Power input to oscillator: | 69 kilowatts |
| Plate voltage: | 6.9 kilovolts |
| Plate current: | 10 amperes |
| Grid current: | 1 ampere |
| Oscillator frequency | 400 kilohertz |
| Tank pressure: | 250 torr |
| Gas flow rates for TAFA model 66 plasma-spray gun: | |
| Radial, argon: | 70 liters/minute |
| Radial, helium: | 148 liters/minute |
| Swirl, argon: | 16 liters/minute |
| Preheat and Transferred | |

TABLE 1-continued

| Plasma Spray Parameters | |
|---|---|
| Arc Cleaning: | |
| current to substrate: | 150 amps |
| voltage between substrate and gun: | 72 volts |
| clean and preheat passes: | 3 |
| Particle Injection: | |
| Carrier Gas, helium: | 4.5 liters/minute |
| Deposition Data: | |
| Target pass length: | 10 inches |
| Target travel rate: | 2 inches/second |
| Distance from gun to substrate: | 9.75 inches |

The three plates were then cut in half so that half the spray deposits could be vacuum heat treated, and the other half of the deposits could be hot isostatically pressed. The Ti-6Al-4V deposits were vacuum heat treated for 3 hours at 900° C. and, hot isostatically pressed for 3 hours at 900° C. and 15 ksi argon pressure. The Ti-14Al-21Nb alloy spray deposits were given similar vacuum heat treatment and hot isostatic pressing except at 950° C.

The spray deposits were milled so the deposit did not extend above the deposit receiving surfaces, and the plate below the trough was milled away leaving two halves of the Ti-6Al-4V alloy plate bonded together with the spray deposit. The milled plates were then machined into tensile test specimens having a spray deposit joint in the center of the test specimen. Tensile specimen preparation and testing were performed in accordance with ASTM specification E8 "Standard Methods of Tension Testing of Metallic Materials", Annual Book of ASTM Standards, Vol. 03.01, pp. 130-150, 1984, or equivalent.

The tensile tests were performed at various temperatures up to 1200° F., and the yield strength, ultimate tensile strength, and percentage elongation measurements from the tensile tests are plotted in FIGS. 5-9 as a function of test temperature. In FIGS. 5-9, the strength and ductility measurements are plotted on the ordinate, and the test temperature is plotted on the abscissa.

Figure 5:
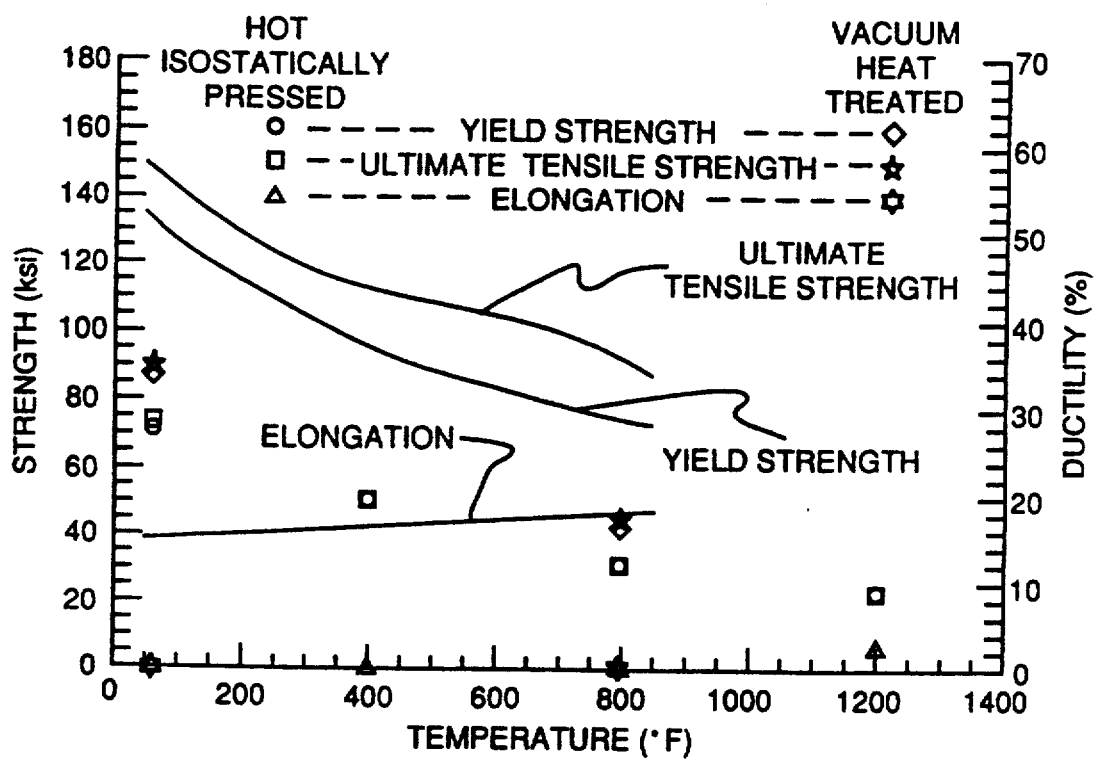
FIGS. 5-9 are graphs presenting the tensile properties of active metal substrate test specimens having a radio frequency low-pressure plasma-sprayed joint at the mid-section of the test specimen, as compared to the tensile properties of the substrate material.
Figure 6:
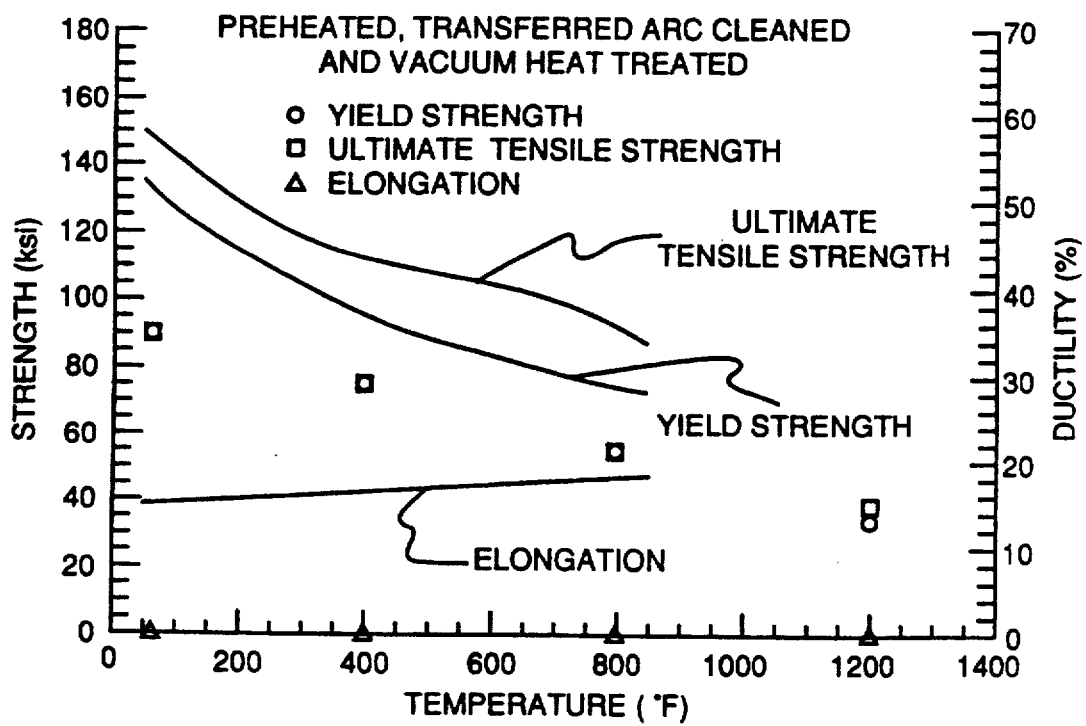
Figure 7:
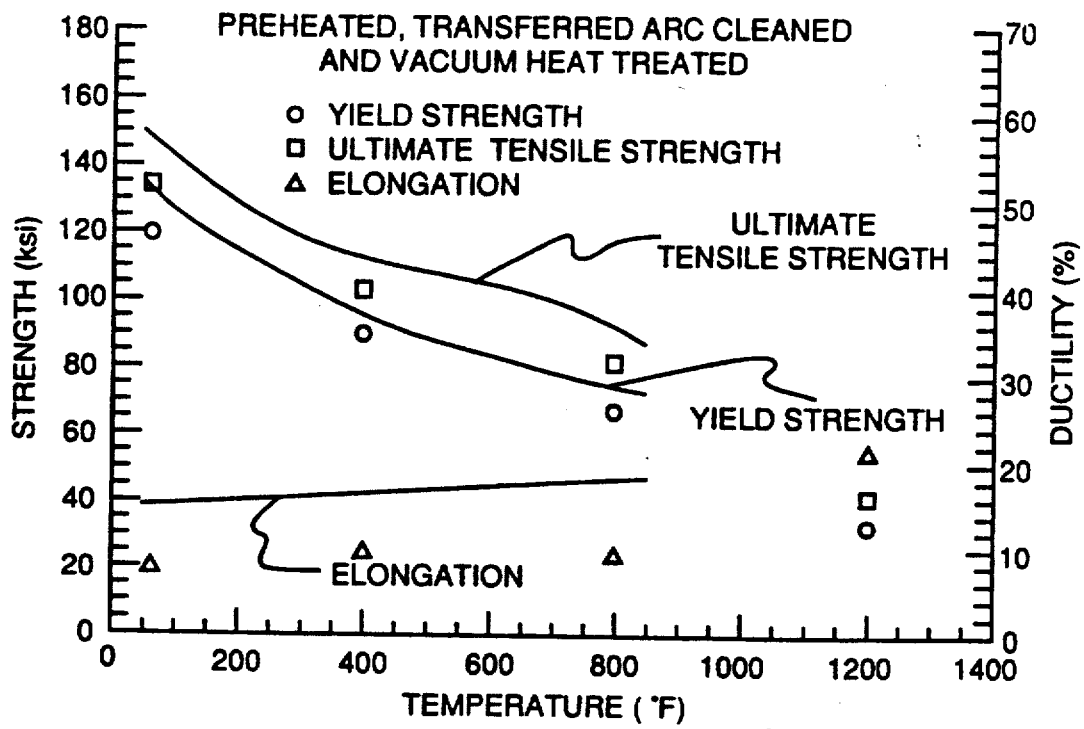
Figure 8:
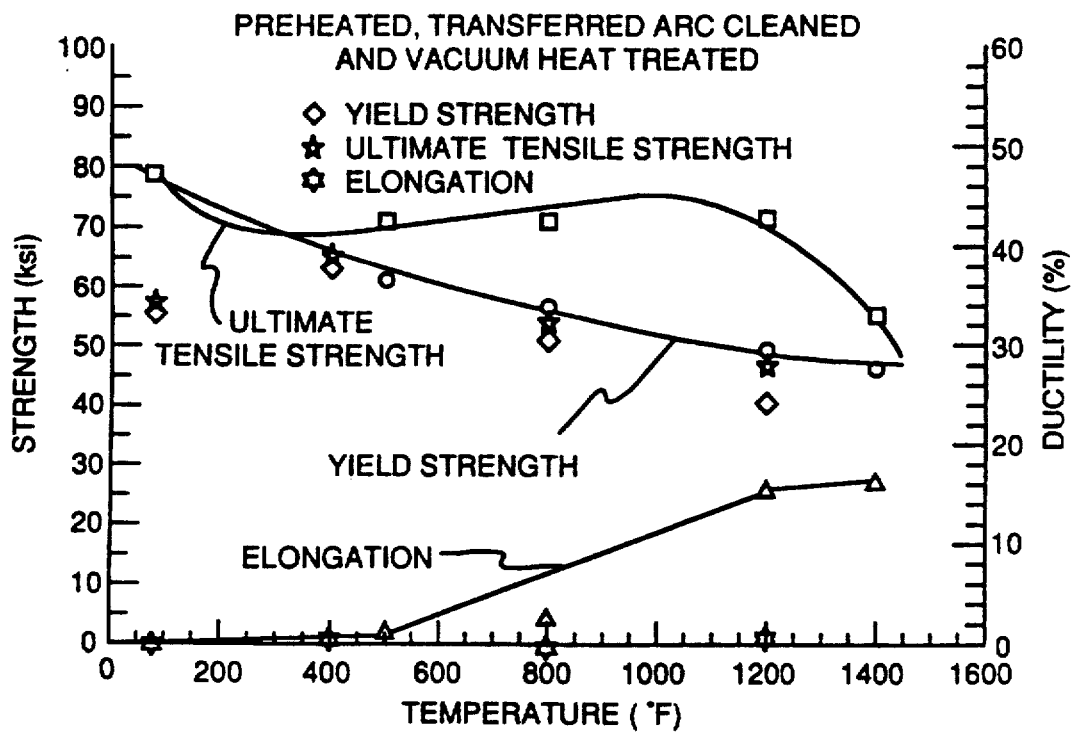
Figure 9:
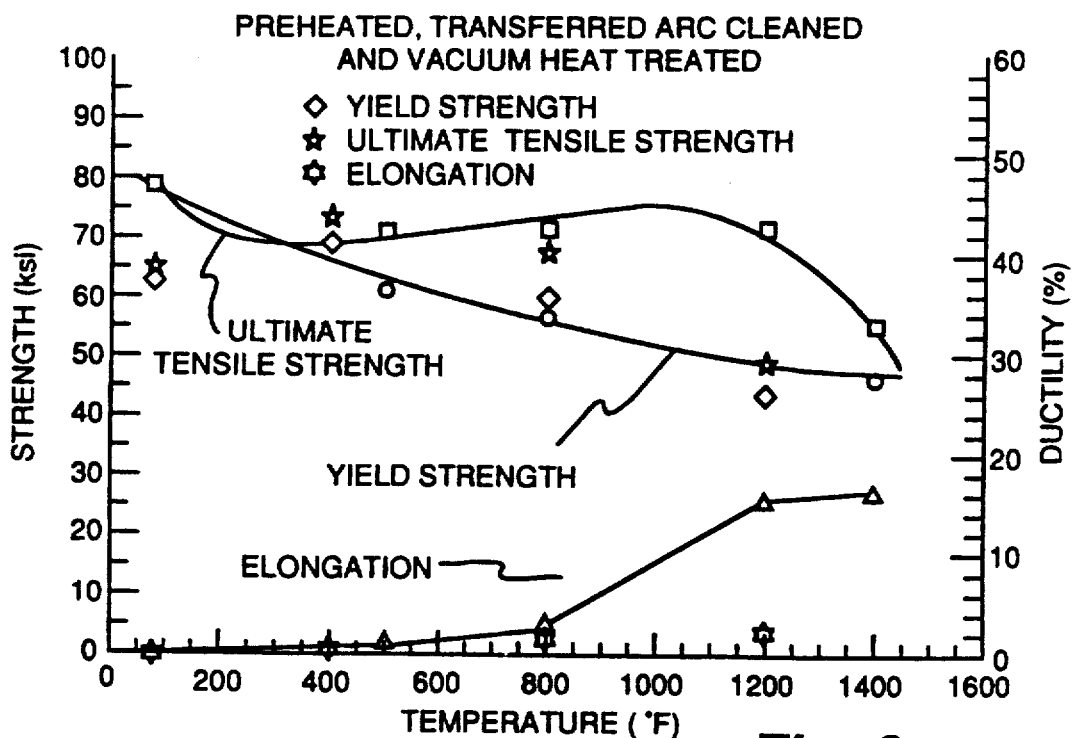

FIG. 5 is a graph of the tensile test measurements for test specimens having spray deposit joints of Ti-6Al-4V that were vacuum heat treated or hot isostatically pressed, but were not preheated or transferred arc cleaned before plasma spraying. FIG. 6 is a graph of the tensile test measurements for test specimens having spray deposit joints of Ti-6Al-4V that were preheated and transferred arc cleaned before plasma spraying, and vacuum heat treated. FIG. 7 is a graph of the tensile test measurements for test specimens having spray deposit joints of Ti-6Al-4V that were preheated and transferred arc cleaned before plasma spraying, and hot isostatically pressed. FIG. 8 is a graph of the tensile test measurements for test specimens having spray deposit joints of Ti-14Al-21Nb that were preheated and transferred arc cleaned before plasma spraying, and vacuum heat treated. FIG. 9 is a graph of the tensile test measurements for test specimens having spray deposit joints of Ti-14Al-21Nb that were preheated and transferred arc cleaned before plasma spraying, and hot isostatically pressed.

The ultimate tensile strength, yield strength, and percentage elongation for conventionally processed, cast and wrought, Ti-6Al-4V is shown for comparison as the plotted lined in FIGS. 5-7. The ultimate tensile strength, yield strength, and percentage elongation for plasma sprayed Ti-14Al-21Nb that had been hot isostatically pressed for 3 hours at 950° C. and 15 ksi argon gas pressure is shown for comparison as the plotted lines in FIGS. 8 and 9.

From the tensile test results shown in FIGS. 5-7, it can be seen that the strength of the joints that were preheated and transferred arc cleaned prior to plasma spraying, shown in FIGS. 6 and 7, is improved over the strength of the tensile specimens that were not preheated or transferred arc cleaned, shown in FIG. 5. The best strength and ductility was provided by the joints that were preheated, transferred arc cleaned, and hot isostatically pressed as shown by the tensile test results in FIG. 7.

As can be seen in FIGS. 8 and 9 the strength of the Ti-14Al-21Nb joints approaches the strength of spray formed and hot isostatically pressed Ti-14Al-21Nb. Therefore Ti-14Al-21Nb is another example of a compatible powder for joining Ti-6Al-4V substrates by the method disclosed herein.

We claim:

1. A method for joining active metal substrates in a deposit zone traversing the areas to be joined on the substrates, comprising:

forming the substrates to have deposit receiving surfaces in the zone;

providing a powder of an active metal compatible to the substrates;

disposing the substrates in a radio frequency low-pressure plasma-spray apparatus to receive a spray deposit in the zone;

cleaning and preheating the deposit receiving surfaces by placing the substrates at a negative DC potential relative to a plasma from the apparatus, and passing the surfaces in heat coupling relation by the plasma; and low-pressure plasma-spray depositing the powder onto the deposit receiving surfaces, to form a deposit in the zone that is diffusion bonded to the deposit receiving surfaces.

2. The method of claim 1 further comprising the step of heating the deposit in an inert atmosphere to cause further diffusion and bonding between the deposit and the surfaces.

3. The method of claim 1 further comprising the step of hot isostatically pressing the deposit to essentially fully densify the deposit.

4. The method of claim 1 where cleaning is performed to remove essentially all oxide from the deposit receiving surfaces.

5. The method of claim 1 where the deposit receiving surface is preheated to provide good diffusion bonding with the deposit.

6. The method of claim 1 where the deposit receiving surface is formed to be at an angle of about 30 to 80 degrees from the sprayed powder.

7. The method of claim 1 where plasma-spray depositing is at a temperature that deposits the powder as liquid droplets without causing melting of the deposit receiving surfaces.

* * * * *